United States Patent [19]

Hirose

[11] Patent Number: 5,575,190

[45] Date of Patent: Nov. 19, 1996

[54] CONTROL VALVE ARRANGEMENT OF AUTOMATIC TRANSMISSION

[75] Inventor: Ikuo Hirose, Fuji, Japan

[73] Assignee: Jatco Corporation, Fuji, Japan

[21] Appl. No.: 317,535

[22] Filed: Oct. 4, 1994

[30] Foreign Application Priority Data

Oct. 4, 1993 [JP] Japan .................................. 5-247263

[51] Int. Cl.⁶ ................................................. F16H 57/02
[52] U.S. Cl. ......................................................... 74/606 R
[58] Field of Search ............................ 74/606 R; 137/884

[56] References Cited

U.S. PATENT DOCUMENTS

| | | | |
|---|---|---|---|
| 4,364,285 | 12/1982 | Morisawa et al. | 74/606 R |
| 4,449,426 | 5/1984 | Younger | 74/606 R X |
| 5,305,663 | 4/1994 | Leonard et al. | 74/866 |

FOREIGN PATENT DOCUMENTS

| | | |
|---|---|---|
| 3831255A1 | 3/1989 | Germany . |
| 4133879A1 | 4/1993 | Germany . |
| 60-84451 | 5/1985 | Japan . |
| 60-93061 | 6/1985 | Japan . |
| 5-38284 | 9/1993 | Japan . |

Primary Examiner—Charles A. Marmor
Assistant Examiner—Saul Rodriguez
Attorney, Agent, or Firm—Foley & Lardner

[57] ABSTRACT

A control valve arrangement for use in an automatic transmission has a recess defined by a lower portion of a transmission case. The recess has therein a mounting surface formed with outlet and inlet openings communicating with fluid passages formed in the transmission case. A center valve body is put on the mounting surface and has therein a hydraulic circuit. The center valve body has a first given portion formed with inlet and outlet openings mated with the transmission case outlet and inlet openings when the center valve body is properly put on the mounting surface. A lower valve body is put on a lower surface of the center valve body and has therein another hydraulic circuit. The lower valve body is constructed to have the same width as the center valve body so that the lower valve body has a second given portion located just below the first given portion of the center valve body. An upper valve body is tightly mounted on an upper surface of the center valve body and has therein yet another hydraulic circuit. A first separate plate is interposed between the center and lower valve bodies, and a second separate plate is interposed between the center and upper valve bodies. A bolt passes through the second given portion, the first separate plate, the first given portion, and the second separate plate, and is detachably connected to the mounting surface to tightly mount the valve unit to the mounting surface.

6 Claims, 3 Drawing Sheets

CONTROL VALVE ARRANGEMENT OF AUTOMATIC TRANSMISSION

BACKGROUND OF THE INVENTION

1. Field of the Invention

The present invention relates in general to automatic transmissions and more particularly to control valve arrangements of the automatic transmission.

2. Description of the Prior Art

Japanese Patent First Provisional Publication 60-84451 shows a control valve arrangement of an automatic transmission. The control valve arrangement disclosed in the publication has a valve structure, which comprises upper and lower bodies coupled together with a separate plate intimately disposed therebetween. Each body is formed with a number of fluid passages, bores with free sliding spool valves, springs, and check balls. The lower body is received in a recess formed on an inner wall of a transmission case. The upper body is larger in size than the lower body and projects upward from the recess. A portion of the upper body extends sideward or laterally beyond an edge of the lower body to constitute a connecting portion. The connecting portion is formed with inlet and outlet openings of the fluid passages formed therein and is secured to a given portion of the transmission case through bolts. The given portion is formed with outlet and inlet openings of fluid passages formed in the transmission case. Thus, upon assembly, the inlet and outlet openings of the connecting portion of the upper body are mated with the outlet and inlet openings of the given portion of the transmission case thereby connecting the fluid passages of both parts.

However, due to its inherent construction, the above-mentioned control valve arrangement has the following drawback.

That is, since the connecting portion of the upper body, which is to be bolted to the transmission case, has therein the fluid passages leading to the inlet and outlet openings, the connecting portion tends to have a bulky construction. That is, in order to define mutually isolated fluid passages of sufficient size in the connecting portion, the size (viz., thickness or width) of the portion must be increased. In other words, in order to fulfill the requirement for additional fluid passages, the connecting portion by itself must deal with such requirement. Accordingly, the connecting portion must carry all the additional fluid passages because of its projected and isolated construction with respect to the lower body. As is known, increasing the size of such connecting portion means increase in size of not only the oil pan of the transmission but also the entire construction of the transmission, and thus causes a difficulty in mounting the transmission on a vehicle body.

SUMMARY OF THE INVENTION

Therefore, it is an object of the present invention to provide a control valve arrangement of an automatic transmission, which is free of the above-mentioned drawback.

According to the present invention, there is provided a control valve arrangement for use in an automatic transmission having a transmission case. The control valve arrangement comprises means defining in a lower portion of the transmission case a recess having therein a mounting surface, the mounting surface being formed with outlet and inlet openings communicated with fluid passages formed in the transmission case. A valve unit is provided with a first valve body having an upper surface put on the mounting surface and having therein a hydraulic circuit. The first valve body has a first given portion formed with inlet and outlet openings mated with the outlet and inlet openings of the transmission case when the first valve body is properly put on the mounting surface. A second valve body is provided with an upper surface put on a lower surface of the first valve body and having therein a hydraulic circuit. The second valve body is constructed to have the same width as the first valve body so that the second valve body has a second given portion located just below the first given portion of the first valve body. A third valve body is tightly mounted on the upper surface of the first valve body and has therein a hydraulic circuit. A first separate plate is interposed between the first and second valve bodies and a second separate plate is interposed between the first and third valve bodies. A rod-like member passes through the second given portion, the first separate plate, the first given portion, and the second separate plate, and is detachably connected to the mounting surface to tightly mount the valve unit to the mounting surface.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
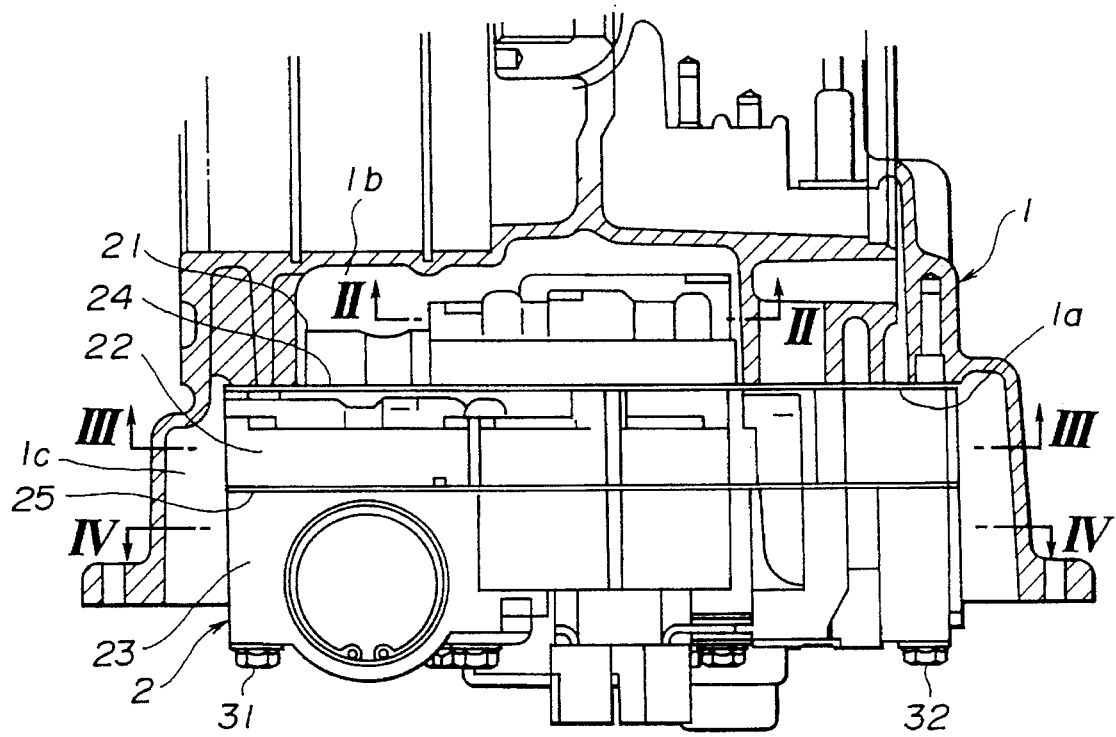
FIG. 1 is a sectional view of a control valve arrangement of an automatic transmission according to the present invention.

Referring to the drawings, particularly FIG. 1, there is shown, but in a sectioned manner, a control valve arrangement of the present invention, which is practically applied to an automatic transmission.

In the drawing, denoted by numeral 1 is a transmission case, which has at its bottom portion a stepped recess facing downward. As shown, the recess comprises a smaller upper part 1b and a larger lower part 1c bounded by a mounting surface 1a formed on a step structure of the transmission case 1. A control valve unit 2 is accommodated in the recess (1b, 1c).

The control valve unit 2 has a three-layered construction, comprising an upper or third body 21, a center or first body 22 and a lower or second body 23 that are put on one another. An upper separate plate 24 is intimately disposed between the upper and center bodies 21 and 22, and a lower separate plate 25 is intimately disposed between the center and lower bodies 22 and 23.

Figure 2:
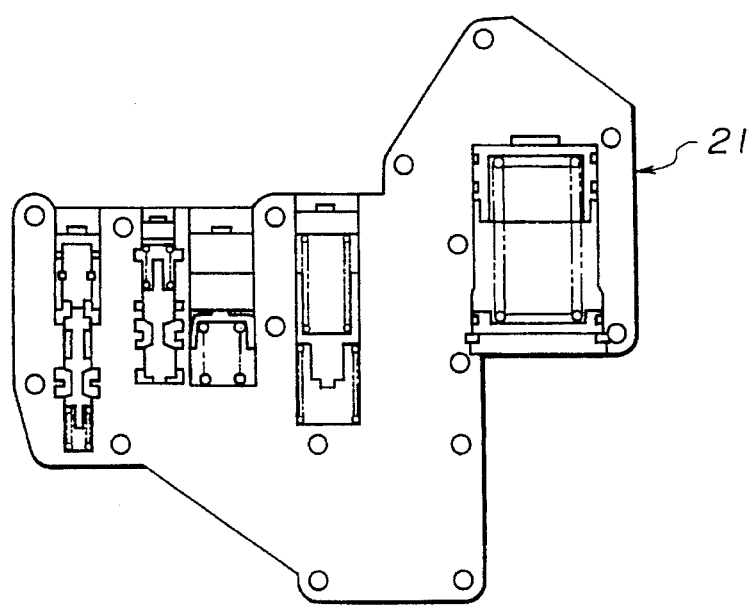
FIG. 2 is a sectional view taken along the line II—II of FIG. 1.
Figure 3:
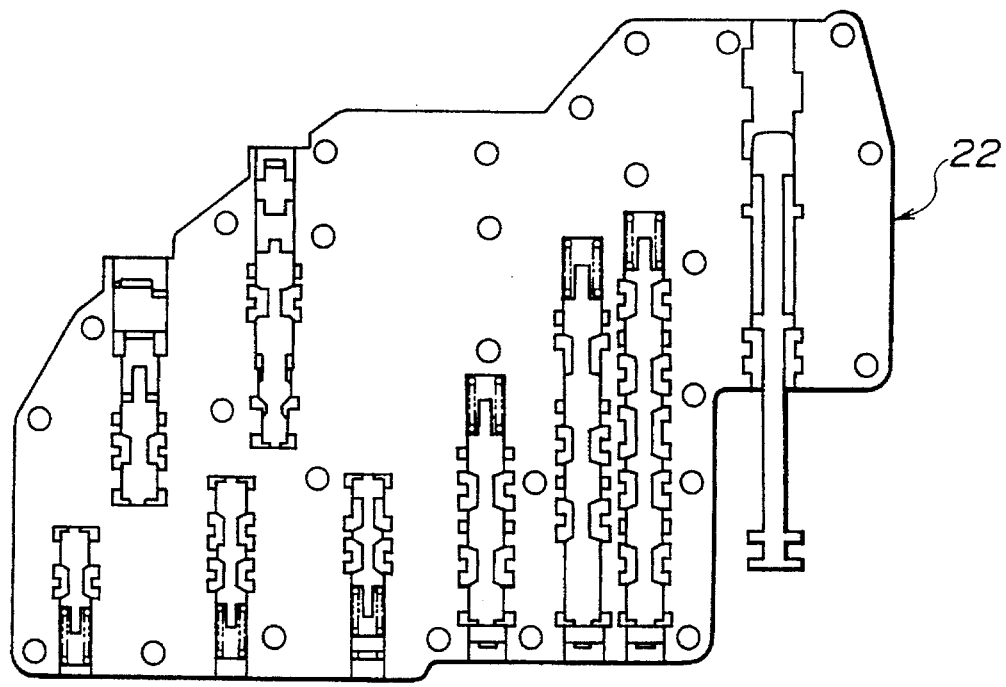
FIG. 3 is a sectional view taken along the line III—III of FIG. 1.
Figure 4:
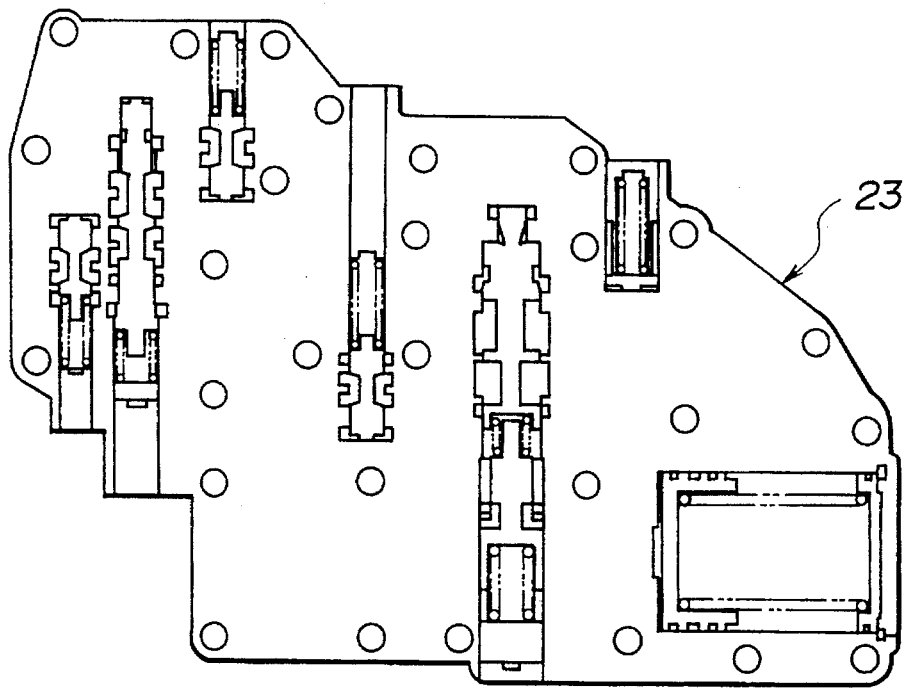
FIG. 4 is a sectional view taken along the line IV—IV of FIG. 1.

As is understood from FIGS. 2, 3 and 4, each of the upper, center and lower bodies 21, 22 and 23 is formed with a number of passages (not shown) for hydraulic fluid, bores with free sliding spool valves, springs, and check valves.

The fluid passages of each body 21, 22 or 23 are connected to the bores to constitute known hydraulic circuits.

The fluid passages of the upper and center bodies 21 and 22 are separated by the upper separate plate 24, and the fluid passages of the center and lower bodies 22 and 23 are separated by the lower separate plate 25. Thus, when the upper and/or lower separate plate 24 and/or 25 is formed with a suitable number of apertures, additional fluid passages, and thus additional hydraulic circuits, can be provided. If the apertures are sufficiently small in size, they can act as orifices, and if the apertures are equipped with biased balls, they can act as check valves.

As is seen from FIG. 1, the upper body 21 has a width smaller than that of the center or lower body 22 or 23 and is received in the smaller upper part 1b of the recess (1b, 1c). The upper body 21 is secured to the center body 22 by means of bolts. The center and lower bodies 22 and 23 have the same width, which is greater than that of the smaller upper part 1b. The center body 22 is put on the mounting surface 1a of the case 1, and the lower body 23 is mounted on a lower surface of the center body 22. For securing the center and lower bodies 22 and 23 to the mounting surface 1a of the case 1, a plurality of bolts 31 and 32 (see FIG. 6) are used, each passing through aligned bores (not shown) formed in the bodies 22 and 23 and tightly engaging with a threaded bore (not shown) formed in the step structure.

The center body 22 has at a given edge portion thereof inlet and outlet openings communicating with the fluid passages formed in the body 22. For ease of description, the given edge portion of the center body 22 will be referred to as a "fluid passage connecting portion" hereinafter. The transmission case 1 has at the mounting surface 1a outlet and inlet openings communicating with fluid passages formed in the case 1. Thus, when the control valve unit 2 is properly assembled and properly put in the recess (1b, 1c) of the transmission case 1, the inlet and outlet openings of the center body 22 become mated with the outlet and inlet openings of the case 1 thereby to connect the fluid passages of these two parts 22 and 1.

It is now to be noted that the "fluid passage connecting portion" (or, the given edge portion) of the center body 22 is placed on a corresponding edge portion of the lower body 23 because of the sameness of the width of these bodies 22 and 23.

Figure 5:
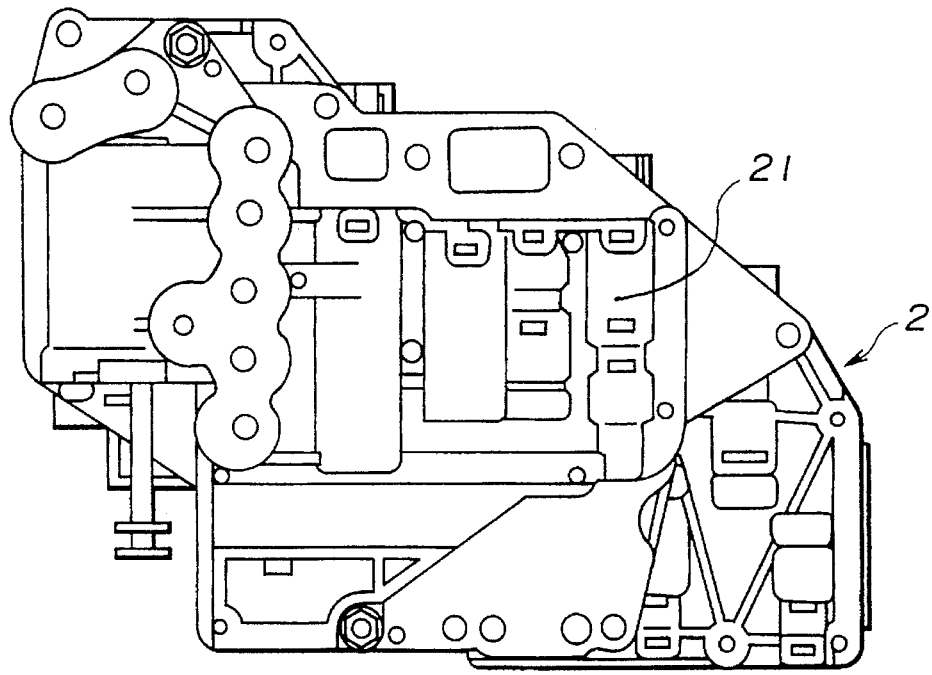
FIG. 5 is a top plan view of a valve unit employed in the control valve arrangement of the invention.
Figure 6:
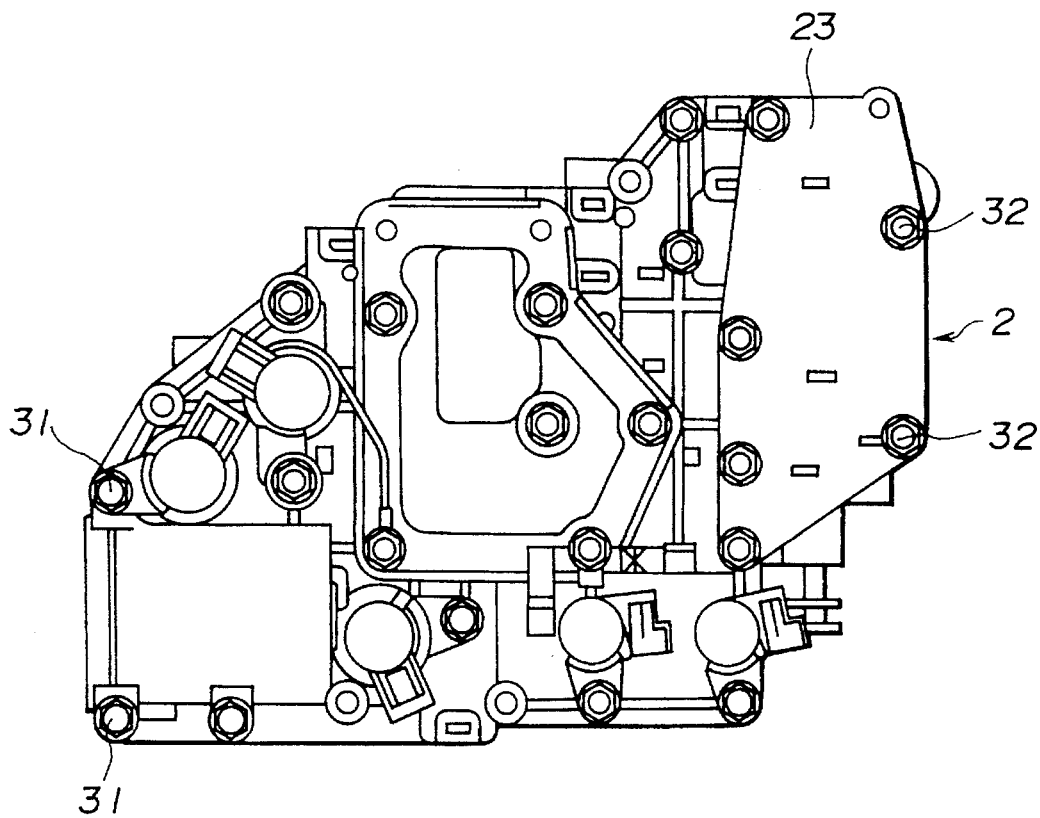
FIG. 6 is a bottom view of the control valve unit.

Other constructional features of the control valve arrangement of the invention will be understood from FIGS. 5 and 6, which are a top plan view of the control valve unit 2 and a bottom view of the same, respectively.

In the following, advantages of the present invention will be described.

First, because the lower body 23 has a certain portion located just below the "fluid passage connecting portion" of the center body 22, the lower body 23 can take over the function of the "fluid passage connection portion" by forming in the certain portion thereof any suitable additional fluid passage needed in the "fluid passage connecting portion". That is, if formation of an additional fluid passage in the "fluid passage connection portion" induces a possibility of interference with another passage formed in that "connecting portion", the lower separate plate 25 may be formed with a suitable number of apertures for constituting a substitute fluid passage with an aid of the fluid passage formed in the lower body 23. It is to be noted that formation of such substitute fluid passage does not induce the need of increasing the sizes of the center and lower bodies 22 and 23. Compact construction of the control valve arrangement is thus possible.

Second, because the center and lower bodies 22 and 23 have the same width, well-balanced contact therebetween is obtained with the lower separate plate 25, and thus sealing therebetween is assured.

If desired, the following modifications are possible in the present invention.

The control valve unit 2 may have a double-layered construction comprising only upper and lower bodies. In this case, the upper and lower bodies must be constructed to have the same width. In fact, in accordance with the present invention, any types of layered construction can be used so long as two of the bodies, which contact each other, are constructed to have the same width.

A three-layered control valve unit is shown in Japanese Utility Model Second Provisional Publication 5-38284 and Japanese Utility Model First Provisional Publication 60-93061. However, the units of the publications fail to have the above-mentioned advantageous features of the present invention.

What is claimed is:

1. A control valve arragment for use with an automatic transmission having a transmission case, comprising: means defining a recess in said transmission case, said recess including a smaller deeper part and a larger shallower part bounded by a mounting surface, said smaller deeper and larger shallower parts being located at opposite positions with respect to said mounting surface, said mounting surface being formed with outlet and inlet openings communicating with fluid passages formed in said transmission case;

a valve unit substantially fully accommodated in said recess of said transmission case and including:

a first valve body having an upper surface put on said mounting surface and having therein a first hydraulic circuit, said first valve body having a first given portion formed with inlet an outlet openings mating with said outlet and inlet openings of said transmission case when said first valve body is put on said mounting surface;

a second valve body having an upper surface put on a lower surface of said first valve body and having therein a second hydraulic circuit, said second valve body having the same width as said first valve body so that said second valve body has a second given portion located just below said first given portion of said first valve body;

a third valve body received in said smaller deeper part of the recess and tightly mounted on the upper surface of said first valve body and having therein a third hydraulic circuit;

a first separate plate interposed between said first and second valve bodies; and a second separate plate interposed between said first and third valve bodies, said second separate plate having an extension interposed between said mounting surface of said transmission case and the upper surface of said first valve body to achieve sealing therebetween; and bolt members each passing through said second given portion, said first separate plate, said first given portion, and said second separate plate, and are detachably connected to said mounting surface to tightly mount said valve unit to said mounting surface, wherein said first, second, and third hydraulic circuits each comprise a number of fluid passages, bores with free sliding spool valves, springs, and check valves.

2. A control valve arrangement as claimed in claim 1, wherein said second given portion is formed with a fluid passage connected to at least one of said inlet and outlet openings of said first given portion to constitute a bypass passage.

3. A control valve arrangement as claimed in claim 2, wherein said bolt members each have a threaded end portion tightly engaged with a threaded bore formed in said mounting surface.

4. A control valve arrangement as claimed in claim 3, wherein said mounting surface is formed on a step structure defined by the lower portion of said transmission case.

5. A control valve arrangement as claimed in claim 4, wherein said first and second valve bodies are received in said larger shallower part of said recess.

6. A control valve arrangement as claimed in claim 5, wherein said third valve body has a width smaller than that of said first valve body.

* * * * *